(12) United States Patent
Kashima et al.

(10) Patent No.: US 7,444,416 B2
(45) Date of Patent: Oct. 28, 2008

(54) SYSTEM USING TIME OR LOCATION WITH ENVIRONMENT CONDITIONS OF SENDER AND ADDRESSEE FOR CONTROLLING ACCESS TO AN ELECTRONIC MESSAGE

(75) Inventors: Tsuyoshi Kashima, Yokohama (JP); Yoshiya Hirase, Tokyo (JP); Shu Kawamura, Tokyo (JP)

(73) Assignee: Nokia Corporation, Espoo (FI)

( * ) Notice: Subject to any disclaimer, the term of this patent is extended or adjusted under 35 U.S.C. 154(b) by 1015 days.

(21) Appl. No.: 10/749,185

(22) Filed: Dec. 30, 2003

(65) Prior Publication Data

US 2005/0182820 A1     Aug. 18, 2005

(51) Int. Cl.
*G06F 15/16* (2006.01)
(52) U.S. Cl. ...................... 709/229; 709/225
(58) Field of Classification Search .......... 709/206, 709/207, 225, 229; 455/419; 600/300
See application file for complete search history.

(56) References Cited

U.S. PATENT DOCUMENTS

| 2001/0034475 | A1* | 10/2001 | Flach et al. ............... 600/300 |
| 2003/0036683 | A1* | 2/2003 | Kehr et al. ............... 600/300 |
| 2004/0030753 | A1* | 2/2004 | Horvitz ..................... 709/206 |
| 2004/0111478 | A1* | 6/2004 | Gross et al. .............. 709/206 |
| 2004/0162063 | A1* | 8/2004 | Quinones et al. ......... 455/419 |

FOREIGN PATENT DOCUMENTS

JP       2002-300627 A    10/2002

* cited by examiner

*Primary Examiner*—Le Luu
(74) *Attorney, Agent, or Firm*—Harrington & Smith, PC

(57) ABSTRACT

A method for controlling access to an electronic message comprising: specifying an addressee for an electronic message; determining a message context for the electronic message by specifying one or more conditions selected from a group comprising a time condition, a location of the addressee condition and at least one other condition concerning the environment of the addressee, wherein the message context defines conditions that must be satisfied before the addressee of the message can access the message;
detecting the context of the addressee and comparing the context of the addressee with the message context; and enabling access by the addressee to the electronic message when the detected context of the addressee corresponds to the message context.

27 Claims, 2 Drawing Sheets

SYSTEM USING TIME OR LOCATION WITH ENVIRONMENT CONDITIONS OF SENDER AND ADDRESSEE FOR CONTROLLING ACCESS TO AN ELECTRONIC MESSAGE

TECHNICAL FIELD

Embodiments of the present invention relate to electronic messages, and, in particular, controlling the conditions under which it is possible to access an electronic message.

BACKGROUND OF THE INVENTION

JP 2002-300627 describes a system in which it is possible to designate a reception location for an email. The email is stored at a server that checks the location of the addressee of the email. The email is stored if the addressee is outside the reception location and is sent only if the addressee is at the reception location.

One problem with this system is that it requires a server for storing and forwarding the emails. This makes it unsuitable for point to point communication technologies.

Another problem with this system is that it is limited and inflexible. It allows only limited control of the conditions under which access to an email is granted.

BRIEF SUMMARY OF THE INVENTION

The context for a person is the circumstances or environment in which that person currently exists. Likewise, the context for a device is the circumstances or environment in which that device currently exists. The context may include the time, the location, the surrounding persons or devices, the temperature etc.

It would be desirable to be able to provide more flexible and less limited control of the conditions under which access to an email is granted by making it possible to have more than one context dependent condition.

It would be desirable to provide for conditional electronic message delivery without the need for a remote server.

According to one embodiment there is provided a method for controlling access to an electronic message comprising: specifying an addressee for an electronic message; determining a message context for the electronic message by specifying one or more conditions selected from a group comprising a time condition, a location of the addressee condition and at least one other condition concerning the environment of the addressee, wherein the message context defines conditions that must be satisfied before the addressee of the message can access the message; detecting the context of the addressee and comparing the context of the addressee with the message context; and enabling access by the addressee to the electronic message when the detected context of the addressee corresponds to the message context.

According to another embodiment of the invention there is provided a mobile terminal for composing electronic messages: comprising a user interface that enables a user to set a context for an electronic message by specifying one or more conditions selected from a group comprising a time condition, a location of the addressee condition and at least one other condition concerning the environment of the addressee, wherein the message context defines conditions that must be satisfied before the message can be accessed by the addressee of the message.

According to another embodiment of the invention there is provided a method for controlling access to an electronic message comprising: specifying an addressee for an electronic message; determining a message context for the electronic message by specifying one or more conditions selected from a group comprising a time condition, a location of the sender condition and at least one other condition concerning the environment of the sender, wherein the message context defines conditions that must be satisfied before the addressee of the message can access the message; detecting the context of the sender and comparing the context of the addressee with the message context; and enabling access by the addressee to the electronic message when the detected context of the sender corresponds to the message context.

According to a further embodiment of the invention there is provided a mobile terminal for composing electronic messages: comprising a user interface that enables a user to set a context for an electronic message by specifying one or more conditions selected from a group comprising a time condition, a location of the addressee condition and at least one other condition concerning the environment of the addressee, wherein the message context defines conditions that must be satisfied before the message can be accessed by the addressee of the message.

According to another embodiment of the invention there is provided a method for controlling access to an electronic message comprising: storing an electronic message, having a context, in an inaccessible state within a terminal wherein the context defines conditions that must be satisfied before the message can be accessed; detecting a context of the terminal using one or more sensors; comparing the detected terminal context with the message context; enabling access to the electronic message when the detected terminal context corresponds to the message context.

According to another embodiment of the invention there is provided a mobile terminal for displaying the content of an electronic message, the terminal comprising: a memory for storing an electronic message and a message context that specifies one or more conditions that must be satisfied before the message can be accessed; detection means for detecting a terminal context that varies with the environment of the terminal and comparing the terminal context with the stored message context; and enabling means for enabling access to the stored electronic message when the detected terminal context corresponds to the message context.

BRIEF DESCRIPTION OF DRAWINGS

For a better understanding of the present invention reference will now be made by way of example only to the accompanying drawings in which.

DETAILED DESCRIPTION OF EMBODIMENT(S) OF THE INVENTION

Figure 1:
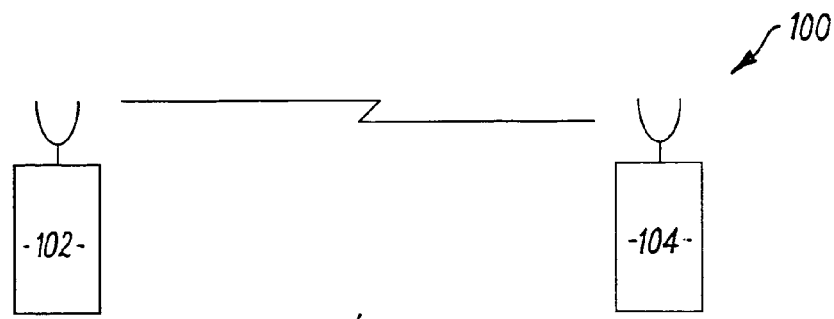
FIG. 1 illustrates a point to point network.

FIG. 1 illustrates a point to point (P2P) network 100 of mobile terminals. A first mobile terminal 102 and a second mobile terminal 104 can communicate directly. The communication is wireless and, in this example, low power radio frequency transceivers such as Bluetooth® transceivers are used.

An electronic message may be sent from one terminal (the originating terminal) to another terminal (the destination terminal) directly. Access to the electronic message at the destination terminal may be controlled, for example, by controlling when the originating terminal sends the message to the destination terminal and/or by controlling when the destination terminal can access a received message.

Figure 2:
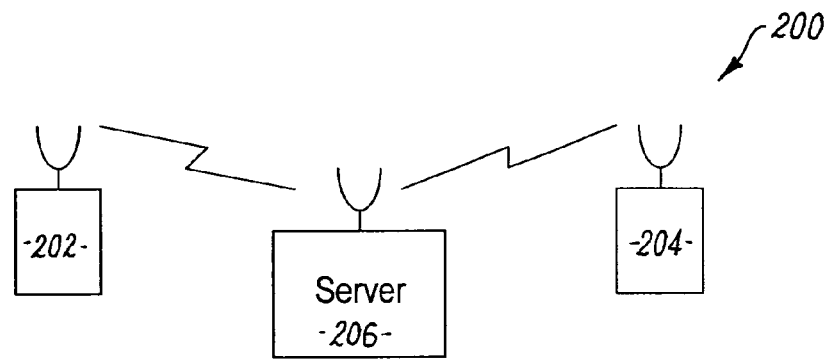
FIG. 2 illustrates a client-server network.

FIG. 2 illustrates a client server network 200 of mobile terminals. A first mobile terminal 202 and a second mobile terminal 204 communicate indirectly via a server 206. The server 206 stores a message sent by an originating terminal and then forwards it to the destination terminal.

Access to the electronic message at the destination terminal may be controlled at the terminals and/or at the server. Control can be exercised at the terminals by controlling when the originating terminal sends the message to the server and/or by controlling when the destination terminal can access a message received from the server. Control can be exercised at the server by controlling when the server forwards a message to the destination terminal.

Figure 3:
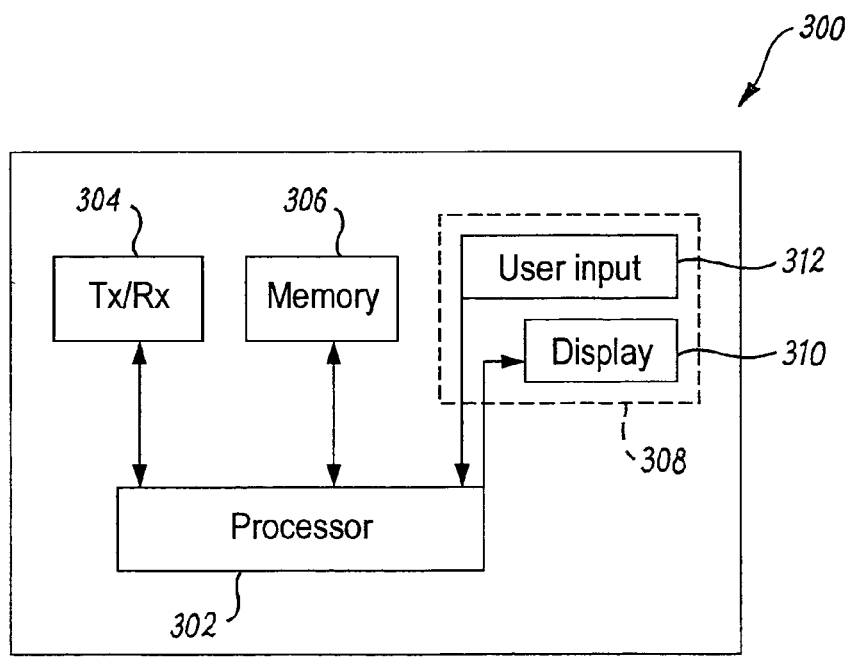
FIG. 3 illustrates a simple terminal that may be used to originate a message.

FIG. 3 schematically illustrates a mobile terminal 300 that is suitable for use in the point to point network illustrated in FIG. 1 and/or the client server network illustrated in FIG. 2.

Referring to FIG. 3, the terminal 300 comprises a processor 302 connected to a radio transceiver 304, a memory 306, and a user interface 308 comprising a display 310 and a user input device 312.

Computer program instructions stored in the memory 306, when loaded into the processor 302 control the operation of the terminal 300.

The user interface 308 may be used to compose electronic messages and send them to another terminal in the point to point network 100 or the client-server network 200. It is well known in the art how to achieve this so it will not be described further.

The user interface 308 allows a user to include content in the message. This content may, for example, be an image captured by a camera (not shown) or text entered by the user using the user input device 312.

The user interface 308 allows the user to specify the destination of the message by, for example, specifying an addressee in the electronic message.

The user interface 308 additionally enables the user to set an 'addressee context' for the electronic message that defines the conditions that must be satisfied before the message can be accessed by the addressee of the message. The context is determined by specifying one or more conditions selected from a group comprising a time condition such as a date and time, a location of the addressee condition and at least one other condition concerning the environment of the addressee. Thus the originator of the message can specify the conditions that must be satisfied before the message can be accessed by the addressee.

The at least one other condition concerning the environment of the addressee may, for example, enable the message originator to specify which device or devices must be proximal to the addressee before the addressee of the message can access the message content. The at least one other condition concerning the environment of the addressee may, for example, enable the message originator to specify the ambient temperature for the addressee before the addressee can access the message content.

The group of conditions from which the user specifies the conditions for delivery of the message is determined by the computer program instructions stored in the memory 306. The group may be varied or augmented with additional conditions concerning the environment of the addressee by adding to or changing the program instructions.

The electronic message is then sent via the radio transceiver 304. It includes the content, the address and the message context.

If the terminal 300, is operating in the point to point network 100 illustrated in FIG. 1 as terminal 102, then the electronic message is sent directly to the destination terminal 104. A suitable destination terminal is illustrated in more detail in FIG. 4.

Figure 4:
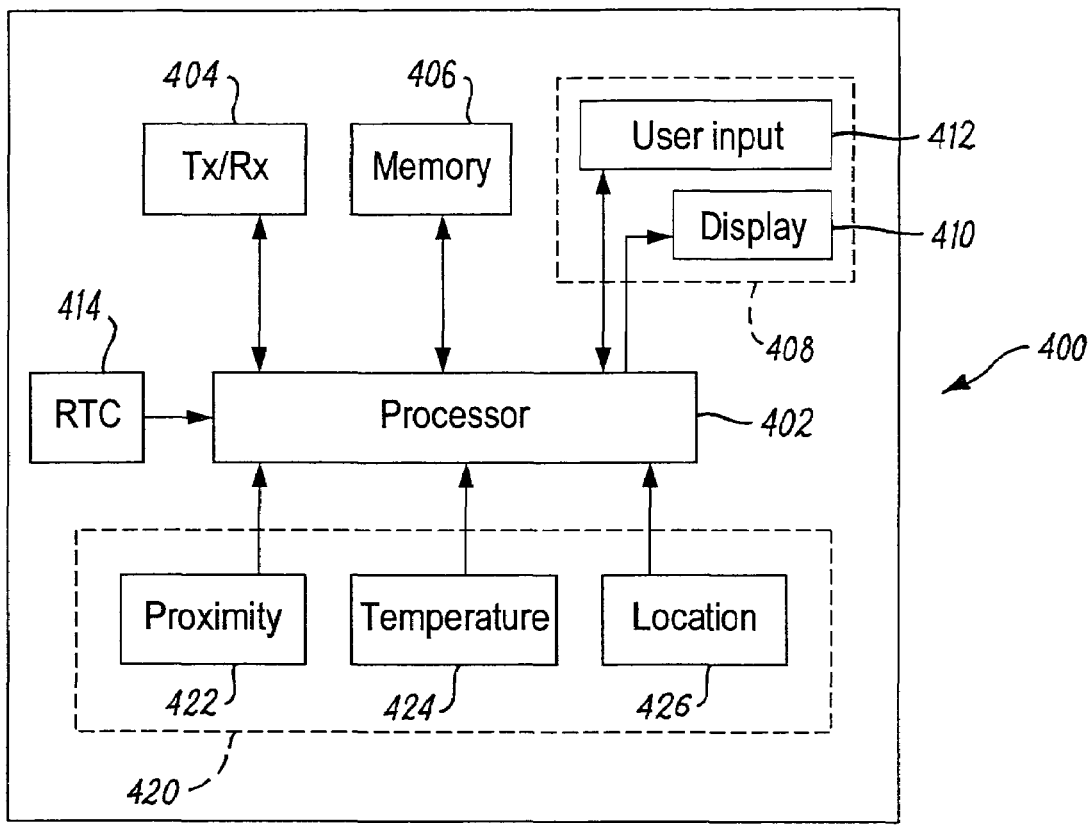
FIG. 4 illustrates a simple terminal that may be used as the origination or destination of a message.

The destination terminal 400, in FIG. 4, comprises a processor 402 connected to a radio transceiver 404, a memory 406, and a user interface 408 comprising a display 410 and a user input device 412. The terminal 400 also includes a real-time clock (RTC) 414 and a plurality of sensors 420, which includes a proximity sensor 422, a temperature sensor 424 and a location sensor 426. The sensors 420 sense the environment of the terminal 400.

The location sensor 426 may be a General Positioning System (GPS) receiver or part of a mobile cellular telecommunications module that can establish a position from triangulation of base station signals.

The proximity sensor 422 may be a Radio Frequency Identification (RFID) receiver that detects signals from nearby RFID tags. Alternatively, the proximity sensor may be a part of the radio transceiver 404 that is used to identify the terminals that are within range e.g. via the Inquiry procedure in Bluetooth.

The temperature sensor 424 may be an electronic thermometer.

The terminal 300 may be arranged so that new sensors may be added. These sensors may comprise additional software that processes inputs from existing hardware and/or new hardware.

The RTC unit, illustrated in this example is a separate hardware unit. In other implementations the real time clock may be provided by a radio clock, by time information from a GPS receiver or time information from a base station of mobile radio telecommunications network.

The processor 402 of the destination terminal 400 receives the message via the radio transceiver 404 and stores it in the memory 406 in an inaccessible state. The message includes the 'addressee context' and the message content. The message is not referred to when the user accesses a message Inbox of the destination terminal 400. Consequently, the user of the destination terminal 400 cannot access the content of the received message and does not know that it has been received.

The processor 402, after receiving such an inaccessible message, begins to detect the context of the destination terminal 400 by processing the inputs from the sensors 420.

The processor 402 compares the detected context with the 'addressee context' of the inaccessible message.

The processor 402 changes the state of the inaccessible message stored in the memory 406 to 'accessible' when the detected context corresponds to the 'addressee context' of the inaccessible message, thereby enabling access to the received electronic message.

When the state of the message is changed to 'accessible', the message is referred to when the user accesses the message Inbox of the destination terminal 400. The content of the message can be accessed via the Inbox in a normal manner.

Although, the above described scenario is such that the originating terminal and destination terminal are different, in other embodiments they may be the same terminal having the functionality illustrated in FIG. 4. The message may then be self-addressed and instead of being transmitted in the network 100 it is stored in an inaccessible state in the memory 406. When the detected context corresponds to the 'addressee context' the message appears in the Inbox.

If the terminal 300 is operating in the client-server network illustrated in FIG. 2 as terminal 202, then the electronic message is sent indirectly to the destination terminal 204 via the server 206. A suitable destination terminal 400 is illustrated in FIG. 4.

The processor 402 of the destination terminal 400 continually detects the context of the destination terminal 400 by processing the inputs from the sensors 420 that sense the local environment. The processor 402 controls the radio transceiver 404 to send intermittently the newly detected destination context of the destination terminal 400 to the server 206.

Figure 5:
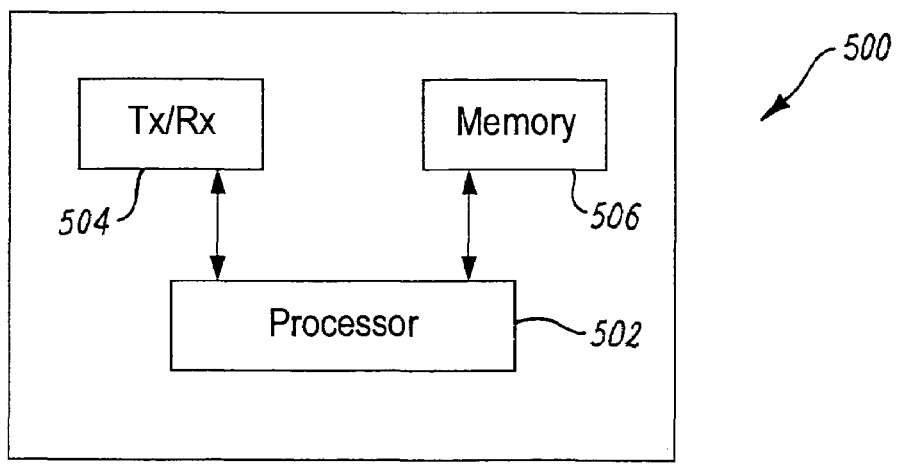
FIG. 5 is server for use in a client-server network.

The server 206 is schematically illustrated in FIG. 5 and referred to, in this Fig using the reference 500. It comprises a radio transceiver 504, a processor 502 and a memory 506.

The sever 500 illustrated in FIG. 5 is only an example. The server may not, for example, comprise a radio transceiver. A network interface may replace the radio transceiver 504 of FIG. 5. This network interface may be connected by cable to a remote, separate radio transceiver module.

The processor 502 of the server 500 receives the electronic message sent from the originating terminal via the radio transceiver 504 and stores it in the memory 506. The message includes the 'addressee context' and the message content.

The processor 502 of the server 500 receives the destination context via the radio transceiver 524 and compares the destination context with the 'addressee context' of the received message.

The processor 502 forwards the stored electronic message to the destination terminal when the received destination context corresponds to the 'addressee context' of the message, thereby enabling access to the received electronic message at the destination terminal. The electronic message may be forwarded without the addressee context.

When the message is received at the destination terminal 400 the content is automatically accessible.

Although, the above described scenario is such that the originating terminal and destination terminal are different, in other embodiments they may be the same terminal having the functionality illustrated in FIG. 4. The message may then be self-addressed and instead of being transmitted in the network 200 to the server it is stored in an inaccessible state in the memory 406. When the detected context corresponds to the 'addressee context' the message becomes accessible.

The terminal of FIG. 3, which is used for originating a message may be adapted to have additional components as illustrated in FIG. 4. As described above, such a terminal may be used, for example, as a destination terminal that controls the accessibility of a received message in a point to point network or a destination terminal in a client-server network, where the server controls the delivery of the message to the destination terminal. Such a terminal may also be used as a 'context aware' originating terminal.

The 'context aware' originating terminal may simply automatically include within a transmitted message information about the context of the originating terminal received from the sensors 420. This may for example indicate the temperature and/or location of the originating terminal when the message was composed and sent.

The 'context aware' terminal may also or alternatively control the circumstances under which a message is sent by the origination terminal either in the P2P network 100 or the client-server network 200.

Computer program instructions stored in the memory 406, when loaded into the processor 402 control the operation of the terminal 400.

The user interface 408 may be used to compose electronic messages and send them to another terminal in the network 100, 200. It is well known in the art how to achieve this so it will not be described further.

The user interface 408 allows a user to include content in the message. This content may, for example, be an image captured by a camera (not shown) or text entered by the user using the user input device 412.

The user interface 408 allows the user to specify the destination of the message by, for example, specifying an addressee in the electronic message.

The user interface 408 additionally enables the user to set a 'sender context' for the electronic message that defines the conditions that must be satisfied before the message can be sent from the terminal 400. The context is determined by specifying one or more conditions selected from a group comprising a time condition such as the date and time, a location of the addressee condition and at least one other condition concerning the environment of the sender. Thus the originator of the message can specify the conditions that must be satisfied before the message can be sent for access by the addressee.

The at least one other condition concerning the environment of the sender may, for example, enable the message originator to specify which device or devices must be proximal to the originating terminal before the message is sent. The at least one other condition concerning the environment of the sender may, for example, enable the message originator to specify the ambient temperature for the originating terminal before the addressee can access the message content.

The group of conditions from which the user specifies the conditions for delivery of the message is determined by the computer program instructions stored in the memory 406. The group may be varied or augmented with additional conditions concerning the environment of the addressee by adding to or changing the program instructions.

When the message has been composed, the processor 402 of the origination terminal 400 stores the unsent message in the memory 406 in an unsendable state.

The processor 402, begins to detect the context of the origination terminal 400 by processing the inputs from the sensors 420.

The processor 402 compares the detected context with the 'sender context' of the un-sendable message.

The processor 402 changes the state of the unsendable message stored in the memory 406 to sendable when the detected context corresponds to the 'sender context' of the inaccessible message, thereby enabling the message to be sent immediately to the destination terminal where it can be accessed.

Although the above described examples refer to electronic messages, it should be understood that an electronic message may be an email, a multi-media messaging service (MMS) message, a Short messaging service (SMS) messages, an Instant Messaging (IM) message or the like.

It should be appreciated that the above described embodiments have particular advantages. For example, a user of a terminal can compose a to-do-list that is related to someone. For example, it may be a reminder to ask a friend to repay some money that was borrowed. The message can be composed as follows. It may be a self-addressed email tht includes as an 'addressee context' a proximity condition the specifies the identity of the friend. When the friend is next near to you, the message will arrive in your Inbox as a reminder.

Although embodiments of the present invention have been described in the preceding paragraphs with reference to various examples, it should be appreciated that modifications to the examples given can be made without departing from the scope of the invention as claimed.

The invention claimed is:

1. A method comprising:
    specifying an addressee for an electronic message;
    determining a message context for the electronic message by specifying one or more conditions selected from a group consisting of a time condition of the addressee, a location of the addressee condition and at least one other condition concerning the environment of the addressee, wherein the message context defines conditions that must be satisfied before the addressee of the message can access the message, wherein the electronic message includes a context of an originator of the electronic message identifying plural conditions concerning an environment of the originator.

2. A method as claimed in claim 1, wherein the group of conditions is augmentable with additional conditions concerning the environment of the addressee.

3. A method as claimed in claim 1, wherein the at least one other condition concerning the environment of the addressee relates to the devices that are proximal to the addressee.

4. A method as claimed in claim 1, wherein the at least one other condition concerning the environment of the addressee relates to the ambient temperature at the addressee.

5. A method as claimed in claim 1, further comprising sending the electronic message to the addressee.

6. An apparatus comprising: a user interface of the apparatus configured to enable a user to set a context for an electronic message by specifying one or more conditions selected from a group consisting of a time condition of the addressee, a location of the addressee condition and at least one other condition concerning the environment of the addressee, wherein the message context defines conditions that must be satisfied before the message can be accessed by the addressee of the message, wherein the apparatus is an originator of the electronic message, wherein the electronic message includes context information identifying plural conditions concerning the environment of the originator.

7. A method comprising:
    specifying an addressee for an electronic message;
    determining a message context for the electronic message by specifying one or more conditions selected from a group consisting of a location of the sender condition and at least one other condition concerning the environment of the sender, wherein the message context defines conditions that must be satisfied before the addressee of the message can access the message, wherein the electronic message includes context information identifying plural conditions concerning the environment of the sender.

8. A method as claimed in claim 7, further comprising sending the electronic message.

9. An apparatus comprising:
    a user interface configured to enable a user to set a context for an electronic message by specifying one or more conditions selected from a group consisting of a location of the sender condition and at least one other condition concerning the environment of the sender, wherein the message context defines conditions that must be satisfied before the message can be sent to the addressee of the message, wherein the electronic message includes context information identifying plural conditions concerning the environment of the sender.

10. A method comprising:
    receiving and storing an electronic message, having a context, in an inaccessible state within a terminal wherein the context defines conditions that must be satisfied before the message can be accessed, wherein the electronic message includes context information identifying plural conditions concerning the environment of a sender of the electronic message;
    detecting a context of the terminal using one or more sensors;
    comparing the detected terminal context with the message context;
    enabling access to the electronic message when the detected terminal context corresponds to the message context.

11. A method as claimed in claim 10, wherein the message context comprises one or more conditions selected from the group consisting of a time condition, a location of the terminal condition and at least one other condition concerning the environment of the terminal.

12. A method as claimed in claim 10, wherein the enabling access comprises placing the stored electronic message in an Inbox of the terminal.

13. A method as claimed in claim 10, further comprising sensing of the environment by the one or more sensors.

14. A method as claimed in claim 13, wherein the plurality of sensors includes a proximity sensor.

15. A method as claimed in claim 13, wherein the one or more sensors includes a temperature sensor.

16. A method as claimed in claim 13, wherein the one or more sensors includes a location sensor.

17. A method as claimed in claim 10, wherein the message is self-addressed.

18. An apparatus comprising:
    a memory configured to store a received electronic message and a message context that specifies one or more conditions that must be satisfied before the message can be accessed, wherein sender context information identifying plural conditions concerning the environment of the sender of the electronic message is stored in the electronic message;
    detection means for detecting context that varies with the environment of the apparatus and comparing the apparatus context with the corresponding stored message context; and
    enabling means for enabling access to the stored electronic message when the detected context corresponds to the message context.

19. An apparatus as claimed in claim 18, wherein the one or more conditions of the message context are selected from a group consisting of a time condition, a location of the apparatus condition and at least one other condition concerning the environment of the apparatus.

20. An apparatus as claimed in claim 18, further comprising a user interface having an Inbox for incoming messages, wherein the enabling means places the stored electronic message in the Inbox.

21. An apparatus as claimed in claim 18, further comprising a plurality of sensors for sensing the environment of the apparatus and the detection means receives inputs from the plurality of sensors.

22. An apparatus as claimed in claim 21, wherein the plurality of sensors includes a proximity sensor.

23. An apparatus as claimed in claim 21, wherein the plurality of sensors includes a temperature sensor.

24. A method comprising:
    receiving an electronic message by a specified addressee of the electronic message, wherein the electronic message includes a context of an originator of the electronic message identifying plural conditions concerning an environment of the originator and includes one or more conditions selected from a group consisting of a time condition of the addressee, a location of the addressee condition and at least one other condition concerning the environment of the addressee, wherein the message context defines conditions that must be satisfied before the addressee of the message can access a content of the electronic message;

detecting the context of the addressee and comparing the context of the addressee with the message context; and enabling access by the addressee to the electronic message when the detected context of the addressee corresponds to the message context.

25. An apparatus comprising:

a memory configured to store an electronic message and a message context that specifies one or more conditions that must be satisfied before the message can be accessed, wherein sender context information identifying plural conditions concerning the environment of the sender is stored in the electronic message;

a detector configured to detect a context that varies with the environment of the apparatus and comparing the apparatus context with the corresponding stored message context; and a controller configured to enable access to the stored electronic message when the detected context corresponds to the message context.

26. A computer readable medium embodied with a computer program, the computer program having instructions which perform the operations comprising:

specifying an addressee for an electronic message;

determining a message context for the electronic message by specifying one or more conditions selected from a group consisting of a time condition of the addressee, a location of the addressee condition and at least one other condition concerning the environment of the addressee, wherein the message context defines conditions that must be satisfied before the addressee of the message can access the message, wherein the electronic message includes a context of an originator of the electronic message identifying plural conditions concerning an environment of the originator.

27. A computer readable medium embodied with a computer program, the computer program having instructions which perform the operations comprising:

receiving an electronic message by a specified addressee of the electronic message, wherein the electronic message includes a context of an originator of the electronic message identifying plural conditions concerning an environment of the originator and includes one or more conditions selected from a group consisting of a time condition of the addressee, a location of the addressee condition and at least one other condition concerning the environment of the addressee, wherein the message context defines conditions that must be satisfied before the addressee of the message can access a content of the electronic message;

detecting the context of the addressee and comparing the context of the addressee with the message context; and enabling access by the addressee to the electronic message when the detected context of the addressee corresponds to the message context.

* * * * *